(12) United States Patent
Tsai et al.

(10) Patent No.: US 9,067,409 B1
(45) Date of Patent: Jun. 30, 2015

(54) DIGITAL INKJET PRINTING METHOD CAPABLE OF IMPARTING TRANSPARENT COLOR TO UV-CURABLE TRANSPARENT INK

(71) Applicant: GREAT COMPUTER CORPORATION, New Taipei (TW)

(72) Inventors: Chen-Chien Tsai, New Taipei (TW); Chi-Hua Yen, New Taipei (TW)

(73) Assignee: Great Computer Corporation, New Taipei (TW)

( * ) Notice: Subject to any disclaimer, the term of this patent is extended or adjusted under 35 U.S.C. 154(b) by 0 days.

(21) Appl. No.: 14/467,739

(22) Filed: Aug. 25, 2014

(51) Int. Cl.
*B41J 2/01* (2006.01)
*B41J 11/00* (2006.01)
*C09D 11/101* (2014.01)

(52) U.S. Cl.
CPC ........... *B41J 2/01* (2013.01); *B41J 11/002* (2013.01); *B41J 11/0015* (2013.01); *C09D 11/101* (2013.01)

(58) Field of Classification Search
None
See application file for complete search history.

(56) References Cited

U.S. PATENT DOCUMENTS

| 2012/0313992 | A1* | 12/2012 | Wada et al. | 347/15 |
| 2013/0127960 | A1* | 5/2013 | Edwards | 347/102 |

* cited by examiner

*Primary Examiner* — Lisa M Solomon
(74) *Attorney, Agent, or Firm* — Muncy, Geissler, Olds & Lowe, P.C.

(57) ABSTRACT

A digital inkjet printing method capable of imparting a transparent color to a UV-curable transparent ink includes: on multiple color ink inkjet heads and a transparent ink inkjet head, setting a first output area and a second output area, respectively; controlling at least one color ink inkjet head to output from the first output area a color ink corresponding to the first output area in a first printing stroke, and at the same time of the output, so as to form a pattern area; and at a partial position, where a transparent effect is to be formed, on the pattern area, simultaneously controlling at least one color ink inkjet head and the transparent ink inkjet head to simultaneously output from the second output area a color ink and a transparent ink corresponding to the second output area in a second printing stroke.

3 Claims, 2 Drawing Sheets

DIGITAL INKJET PRINTING METHOD CAPABLE OF IMPARTING TRANSPARENT COLOR TO UV-CURABLE TRANSPARENT INK

BACKGROUND

1. Technical Field

The present invention relates to a digital inkjet printing method capable of imparting a transparent color to a UV-curable transparent ink, so as to improve an added value and market competitiveness of a printed product.

2. Related Art

A UV inkjet printer can print on various objects to be printed of different materials or thicknesses, so that a fast printing speed is provided and stable and consistent print quality is achieved, and moreover, with reliable performance of the UV inkjet printer, printing can be rapidly completed because the work for fabricating a color separation screen is omitted and the time is saved for a user. Therefore, UV inkjet printers are widely used in professional and commercial outputs such as advertisements, posters, and high-quality art reproduction.

A commercially available UV inkjet printer at present mainly includes an inkjet module capable of being controlled to move to and fro and disposed on a sliding platform of a machine, a plurality of ink cartridges disposed above the inkjet module, and a plurality of inkjet heads corresponding to the ink cartridges and disposed below the inkjet module. A jet nozzle at the bottom of the inkjet head jets ink on an object to be printed, and then a UV lamp disposed at a side of the inkjet module projects light on the ink that has been jetted and printed on the object to be printed, so that the ink is rapidly cured and solidified. During printing on an object to be printed, conventionally a unidirectional single printing mode or a bi-directional back and forth printing mode is adopted to print each area to be printed of the object to be printed, so as to shorten the time of printing. If a surface of the object to be printed is required to have a transparent effect after printing is completed, when printing of a pattern in each area to be printed of the object to be printed is completed, a layer of a transparent ink is generally jetted and the transparent ink jetted on the area to be printed is immediately cured by using a UV lamp, so as to form a transparent layer on the pattern in the area to be printed, thereby forming a transparent three-dimensional effect on the surface of a printed product of the processed object.

However, in the manner described above, a transparent effect is merely formed on a color pattern. Therefore, it is a research direction of the inventor to make a transparent ink to exhibit a slight color effect to improve an added value and market competitiveness of a printed product.

SUMMARY

A main objective of the present invention is to provide a digital inkjet printing method capable of imparting a transparent color to a UV-curable transparent ink and having simple steps.

In order to achieve the above objective, a digital inkjet printing method capable of imparting a transparent color to a UV-curable transparent ink according to the present invention includes the followings steps:

Step a: first, on n jet nozzles on multiple color ink inkjet heads for outputting different color inks and n jet nozzles on a transparent ink inkjet head for outputting a transparent ink, setting a first output area (the first to the $m^{th}$ jet nozzle, m<n) and a second output area (the $(m+1)^{th}$ to the $n^{th}$ jet nozzle), respectively;

Step b: controlling at least one color ink inkjet head to output from the first output area a color ink corresponding to the first output area in a first printing stroke, and at the same time of the output, starting a UV curing module to cure the ink of the first output area, so as to form a pattern area; and Step c: at a partial position, where a transparent effect is to be formed, on the pattern area, simultaneously controlling at least one color ink inkjet head and the transparent ink inkjet head to simultaneously output from the second output area a color ink and a transparent ink corresponding to the second output area in a second printing stroke, where this printing stroke may be repeated i times (i≥1), the UV curing module is not started during the i−1 times of the printing output process, and finally during the $i^{th}$ time of the output process, the UV curing module is started to cure the inks.

In an implementation, in Step c, the multiple color ink inkjet heads and the transparent ink inkjet head may be simultaneously controlled to output from the second output area color inks and the transparent ink corresponding to the second output area multiple times in the second printing stroke.

In an implementation, the color density output from the second output area on the color ink inkjet head is lower than that output from the first output area.

In order to make the present invention more comprehensible, the specific formation of and efficacy achieved by the present invention are described in detail below with reference to the preferred embodiments, the accompanying drawings, and reference numerals.

BRIEF DESCRIPTION OF THE DRAWINGS

The present invention will become more fully understood from the detailed description given herein below for illustration only, and thus are not limitative of the present invention, and wherein.

DETAILED DESCRIPTION

Figure 1:
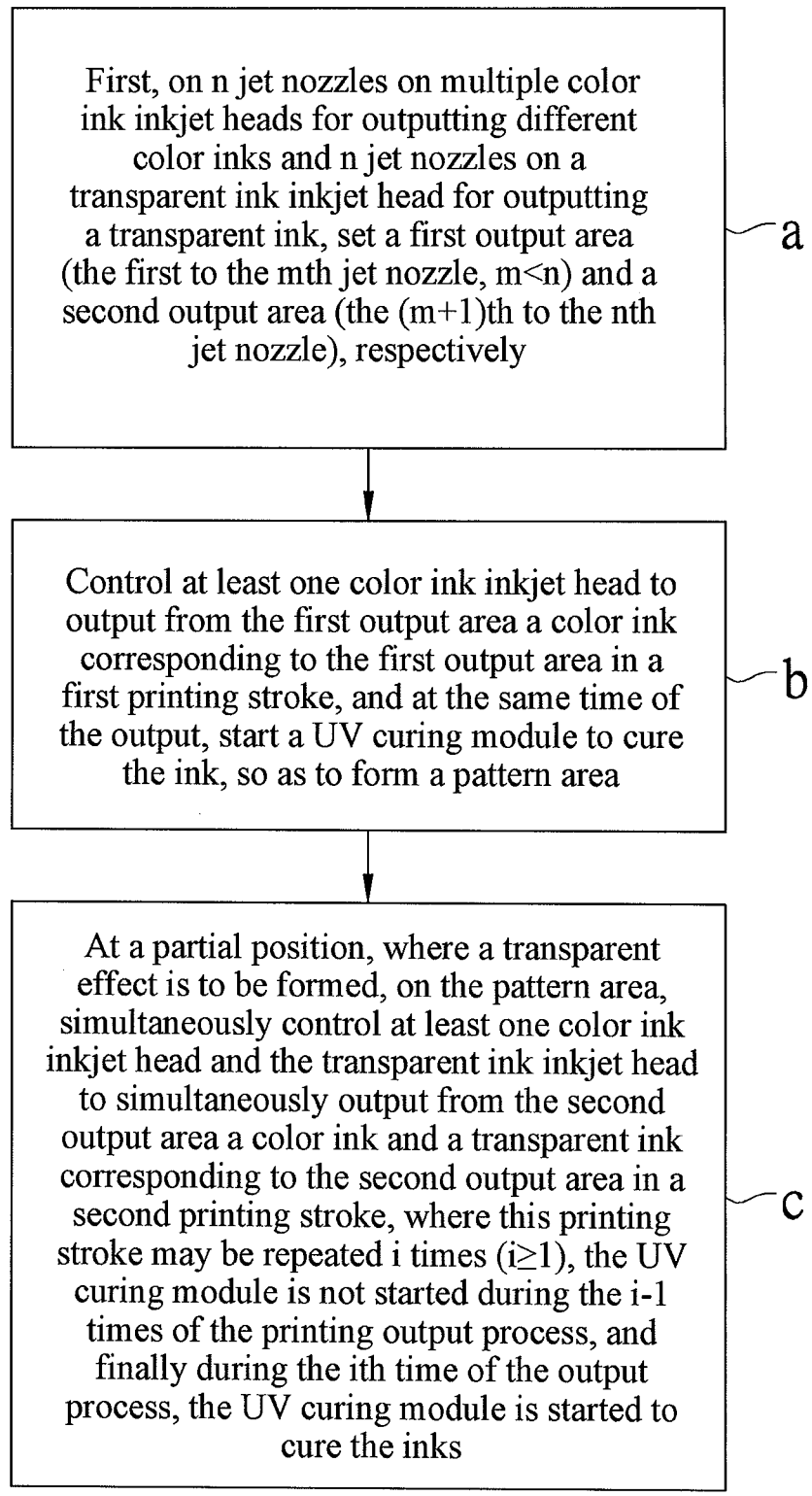
FIG. 1 is a flow chart of an embodiment of the present invention.

FIG. 1 shows an embodiment of a digital inkjet printing method capable of imparting a transparent color to a UV-curable transparent ink of the present invention. Referring to FIG. 1, the method includes the following steps:

Step a: first, on n jet nozzles on multiple color ink inkjet heads for outputting different color inks and n jet nozzles on a transparent ink inkjet head for outputting a transparent ink, setting a first output area (the first to the $m^{th}$ jet nozzle, m<n) and a second output area (the $(m+1)^{th}$ to the $n^{th}$ jet nozzle), respectively;

Step b: controlling at least one color ink inkjet head to output from the first output area a color ink corresponding to the first output area in a first printing stroke, and at the same time of the output, starting a UV curing module to cure the ink of the first output area, so as to form a pattern area; and Step c: at a partial position, where a transparent effect is to be formed, on the pattern area, simultaneously controlling at least one color ink inkjet head and the transparent ink inkjet head to simultaneously output from the second output area a color ink and a transparent ink corresponding to the second output area in a second printing stroke, where this printing stroke may be repeated i times (i≥1), the UV curing module is not started during the i−1 times of the printing output process, and finally during the $i^{th}$ time of the output process, the UV curing module is started to cure the inks.

In Step c, the multiple color ink inkjet heads and the transparent ink inkjet head may be simultaneously controlled to output from the second output area color inks and the transparent ink corresponding to the second output area multiple times in the second printing stroke, and the color density output from the second output area on the color ink inkjet head is lower than that output from the first output area.

Figure 2:
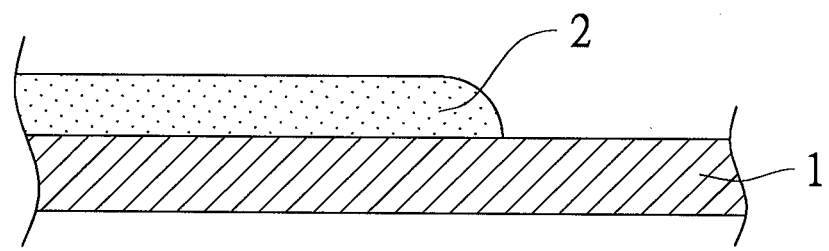
FIG. 2 is a schematic diagram of a state after an embodiment of the present invention is implemented.

Therefore, as shown in FIG. 2, through the above steps, in a first printing stroke, a material to be printed moves forward, a color ink corresponding to a first output area is output from the first output area to form a color pattern area 1, and a UV curing module is started during the output process to cure the ink. After the output from the first output area is completed, the material to be printed does not move forward. However, because the color pattern area 1 that is formed in Step b and is originally located in the first output area has moved forward to a second output area, at a partial position, where a transparent effect is to be formed, on the color pattern area 1 of Step b, at least one color ink inkjet head and the transparent ink inkjet head are simultaneously controlled to simultaneously output from the second output area a color ink and a transparent ink corresponding to the second output area in a second printing stroke, so as to form a color transparent ink layer 2 on the color pattern area 1, where this printing stroke may be repeated i times (i≥1), the UV curing module is not started during the i−1 times of the printing output process, and finally during the $i^{th}$ time of the output process, the UV curing module is started to cure the inks.

The specific embodiments and applied technical means of the present invention are described above. Various variations and modifications can be derived based on the disclosure or teachings described herein. Any equivalent changes made based on the concept of the present invention and having their effects not departing from the substantial spirit encompassed by the specification and drawings shall be construed as falling within the technical scope of the present invention.

In view of the above, according to the aforementioned disclosure, the present invention surely can achieve the expected objectives and provides a digital inkjet printing method capable of imparting a transparent color to a UV-curable transparent ink, which is very industrially applicable. Thus, the application for a patent is filed according to the law.

What is claimed is:

1. A digital inkjet printing method capable of imparting a transparent color to a UV-curable transparent ink, comprising:

Step a: first, on n jet nozzles on multiple color ink inkjet heads for outputting different color inks and n jet nozzles on a transparent ink inkjet head for outputting a transparent ink, setting a first output area (the first to the $m^{th}$ jet nozzle, m<n) and a second output area (the $(m+1)^{th}$ to the $n^{th}$ jet nozzle), respectively;

Step b: controlling at least one color ink inkjet head to output from the first output area a color ink corresponding to the first output area in a first printing stroke, and at the same time of the output, starting a UV curing module to cure the ink of the first output area, so as to form a pattern area; and Step c: at a partial position, where a transparent effect is to be formed, on the pattern area, simultaneously controlling at least one color ink inkjet head and the transparent ink inkjet head to simultaneously output from the second output area a color ink and a transparent ink corresponding to the second output area in a second printing stroke, wherein this printing stroke may be repeated i times (i≥1), the UV curing module is not started during the i−1 times of the printing output process, and finally during the $i^{th}$ time of the output process, the UV curing module is started to cure the inks.

2. The digital inkjet printing method capable of imparting a transparent color to a UV-curable transparent ink according to claim 1, wherein in Step c, the multiple color ink inkjet heads and the transparent ink inkjet head may be simultaneously controlled to output from the second output area color inks and the transparent ink corresponding to the second output area multiple times in the second printing stroke.

3. The digital inkjet printing method capable of imparting a transparent color to a UV-curable transparent ink according to claim 1, wherein the color density output from the second output area on the color ink inkjet head is lower than that output from the first output area.

* * * * *